(No Model.)
A. HABERNICHT.
FAUCET.
No. 343,451. Patented June 8, 1886.
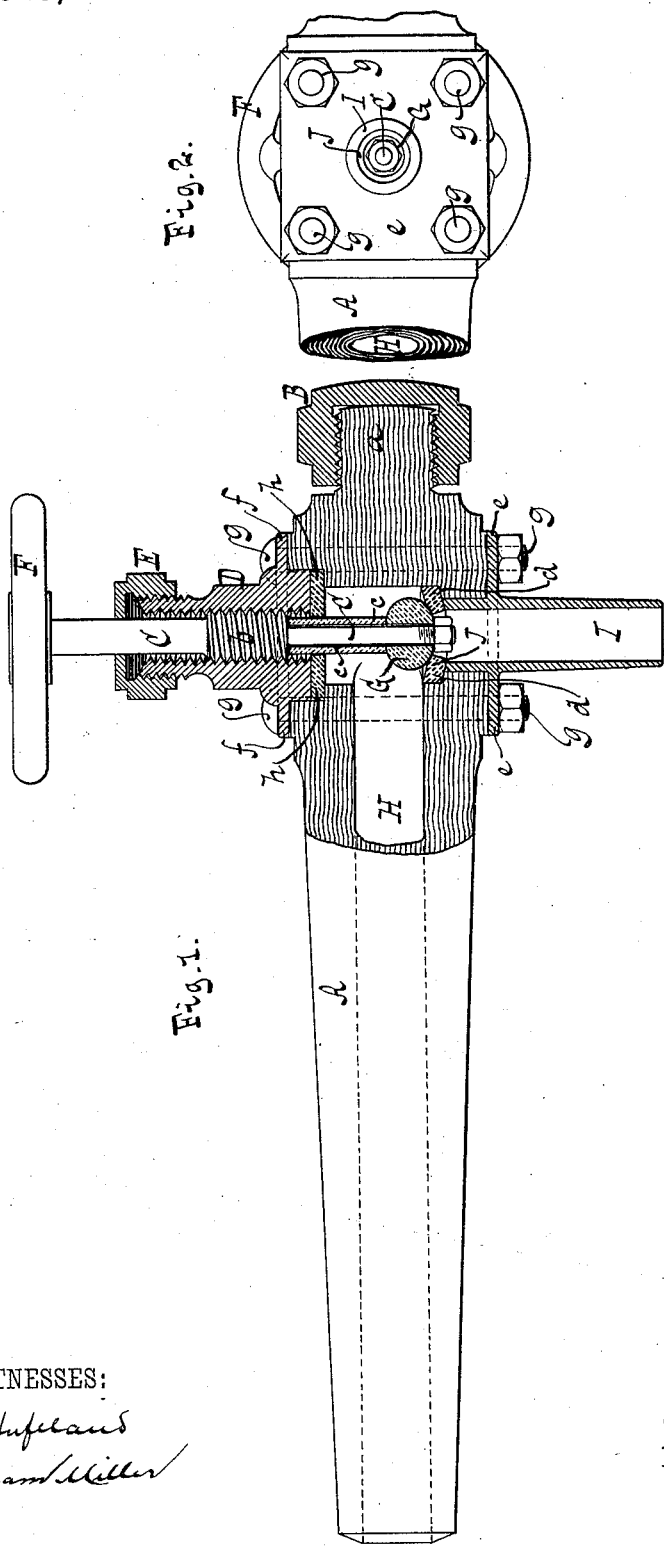
WITNESSES:
Otto Hufeland
William Miller
INVENTOR
August Habernicht
BY
Van Santvoord & Hauff
ATTORNEYS

United States Patent Office.

AUGUST HABERNICHT, OF NEW YORK, N. Y.

FAUCET.

SPECIFICATION forming part of Letters Patent No. 343,451, dated June 8, 1886.

Application filed March 25, 1886. Serial No. 196,551. (No model.)

*To all whom it may concern:*

Be it known that I, AUGUST HABERNICHT, a citizen of the United States, residing at New York, in the county and State of New York, have invented new and useful Improvements in Faucets, of which the following is a specification.

This invention relates to faucets comprising a body of wood or other material not affected by acids.

The invention consists in the construction and combination of devices hereinafter described and claimed, reference being made to the accompanying drawings, in which—

Figure 1 is an elevation of my faucet showing the working parts in section. Fig. 2 is an inverted plan or bottom view of a portion of my faucet.

Similar letters indicate corresponding parts.

In the drawings, the letter A designates the body of my faucet, made of wood or other material not affected by acids. On its outer end a threaded boss, $a$, serves to hold a metal cap, B, to protect the faucet from splitting when it is driven into a vessel by blows from a hammer.

C is the valve-stem of metal provided with a screw-thread, $b$, which engages a nut, D, secured to the upper surface of the body A. A stuffing-box, E, serves to make the joint between the stem and the nut tight. The upper end of the stem C carries a hand-wheel, F, while to its lower end is secured the ball-shaped valve G, which, when the faucet is closed, rests on a valve-seat, J, made of rubber or other elastic material not affected by acids. The valve is made of glass or other vitreous substance, while that portion of the stem which is exposed to the liquid is protected by a coating, $c$, of similar material. Between the nut D and the body A is secured a ring, $h$, of rubber, which surrounds the glass-coated stem of the valve, and protects the nut from contact with the liquid and the consequent oxidation or corrosion.

In the example shown in the drawings the valve-seat J consists of a ring of rubber or other elastic material secured below the main opening H of the faucet, and resting on a shoulder, $d$. The spout I is secured to a flange-plate, $e$, and projects into the body of the faucet sufficiently to support the center of the elastic valve-seat, so that when the valve is closed the valve-seat will have a rigid metallic support, greatly enhancing its durability and effectiveness. The lower portion of the nut is encircled by a flange-plate, $f$, provided with openings for the bolts or rivets $g$, which pass through corresponding openings in the flange $e$, which carries the spout. These flanges, which respectively carry the nut and the spout, also serve to strengthen that portion of the faucet, and together with the bolts $g$, which pass through the body A, hold the working parts rigidly together, thereby totally removing the strain of the valve from the wooden body of the faucet and preventing the latter from splitting.

It is obvious that the plates $e$ and $f$ may be detached from the nut D and the spout I, and still serve to strengthen the faucet to which these parts may be attached in some other manner.

What I claim as new, and desire to secure by Letters Patent, is—

1. The combination of the wooden faucet-body A, having elastic valve-seat J, the nut D, having plate $f$, spout I, having plate $e$, the bolts $g\ g$, passed through the faucet-body and plates $f\ e$, and the valve G, composed of vitreous material and having a threaded valve-stem engaging the nut D, said valve-stem having a protective coating, substantially as described.

2. A faucet composed of a wooden body having an elastic valve-seat, a spout and a nut secured to opposite sides of said body, a valve-stem engaging said nut and provided with a protective coating, and a valve of vitreous material secured to the valve-stem, substantially as described.

In testimony whereof I have hereunto set my hand and seal in the presence of two subscribing witnesses.

AUGUST HABERNICHT. [L. S.]

Witnesses:
W. HAUFF,
A. FABER DU FAUR, Jr.